United States Patent [19]

Maekawa et al.

[11] Patent Number: 5,235,518
[45] Date of Patent: Aug. 10, 1993

[54] VENEER COMPOSER

[75] Inventors: Sachio Maekawa, Okazaki; Toshiyuki Nagura, Toyoda; Shinjiro Kamiya, Higashiura; Kazuo Inuzuka, Nishio; Hirokazu Mizuno, Kariya; Kazunori Honda, Nishio, all of Japan

[73] Assignee: Hashimoto Denki Co., Ltd., Aichi, Japan

[21] Appl. No.: 661,539

[22] Filed: Feb. 27, 1991

[30] Foreign Application Priority Data

| Mar. 2, 1990 | [JP] | Japan | 2-52357 |
| Mar. 8, 1990 | [JP] | Japan | 2-57558 |
| Mar. 8, 1990 | [JP] | Japan | 2-57559 |
| Mar. 28, 1990 | [JP] | Japan | 2-79700 |

[51] Int. Cl.$^5$ .............................. G06F 15/46
[52] U.S. Cl. .................. 364/474.3; 364/469; 364/474.09; 144/356
[58] Field of Search .................. 364/474.3, 468, 469, 364/478, 474.09; 83/78–80, 371, 372; 144/356, 357; 198/341, 343.1, 345.1

[56] References Cited

U.S. PATENT DOCUMENTS

| Re. 28,627 | 11/1975 | Clausen et al. | 156/544 |
| 3,963,555 | 6/1976 | Zweig | 156/312 |
| 4,691,817 | 9/1987 | Haar | 198/341 |
| 4,934,228 | 6/1990 | Bolton et al. | 144/356 |
| 5,035,164 | 7/1991 | Cremona | 144/356 |
| 5,058,473 | 10/1991 | Yamada | 83/372 |

Primary Examiner—Jerry Smith
Assistant Examiner—Thomas E. Brown
Attorney, Agent, or Firm—Wenderoth, Lind & Ponack

[57] ABSTRACT

A veneer composer transfers veneer pieces intermittently on a conveyor, detects the transfer of each veneer piece, cuts the veneer piece into an available width based on a detected signal, joins the veneer pieces end to end to form a composed veneer plate of long length, and cuts the composed veneer plate into a predetermined full size. The conveyor is connected to servo motors and a digital control circuit. The digital control circuit controls operation such that when the conveyor is restarted after an operation of cutting a veneer piece, a buffer acceleration time (Ta) approximately from 40 ms to 200 ms is set for the conveyer, and that when the conveyer is decelerated for setting the veneer piece to a predetermined cutting position, a buffer deceleration time (Td) approximately from 80 ms to 200 ms is set for the conveyor.

8 Claims, 11 Drawing Sheets

VENEER COMPOSER

BACKGROUND OF THE INVENTION

The present invention relates to a veneer composer operable to convey veneer pieces of small width cut out of log and dried, cut out inferior portions of the veneer piece by a first clipper into a maximum available width, join the veneer pieces end to end to form a long size composed veneer plate, and again cut the composed veneer plate by a second clipper into a predetermined length to form a full size veneer plate.

Conventionally, a veneer composer as shown in FIG. 1 has been used, in which veneer pieces 1a of small width are carried forwardly by plural sets of infeed conveyors 2 which are arranged in parallel to hold the veneer piece from above and below. The veneer pieces usually have some inferior portions therein, such as irregular shaped front and rear edges and/or cracks or knotholes at a mid portion thereof, which have to be cut out before the veneer pieces are composed. To this end, plural sets of detectors 3 such as limit switches or photo-electric switches are provided between the parallel infeed conveyors 2 for detecting the inferior portions of the veneer pieces 1a.

At the forward end of the infeed conveyors 2 is provided a first clipper 4 for cutting each veneer piece into a maximum available width. The clipper 4 is arranged to be controlled by a signal from the detectors 3 to cut the inferior portions of the veneer piece 1a when the veneer piece 1a stops traveling at a predetermined position after passing through the detectors 3.

Provided at the forward portion of the first clipper 4 and the infeed conveyors 2 is a pitching conveyor 5 which is connected at the forward end portion thereof to a rear end pulley of an outfeed conveyor 6 and which is arranged to be able to swing upwardly from a horizontal position about a central axle of the rear end pulley. When the clipper 4 cuts the front irregular edge of the veneer piece 1a, the pitching conveyor 5 swings upwardly and allows the irregular shaped front edge cut out of the veneer piece to fall downwardly. Immediately thereafter, the pitching conveyor 5 returns to the horizontal position to allow the cut veneer piece 1a to travel thereon. When the clipper 4 cuts the rear irregular edge of the veneer piece 1a, the pitching conveyor 5 does not swing upwardly but stays at the horizontal position. The pitching conveyor 5 is provided so as to carry the veneer piece by holding it from above and below.

Along the course of the outfeed conveyor 6 are provided a spot applicator 7 and a thread nozzle 8. The spot applicator 7 applies adhesive agent such as hot melt resin to front and rear ends of the veneer piece, while the thread nozzle 8 supplies an adhesive thread or ribbon onto the upper surface of the veneer piece. Provided forwardly of the thread nozzle 8 are a pair of upper and lower brake rail members 9 which decelerate the traveling speed of the pieces from the outfeed conveyor 6 and adhere cause abutment and adhering of the successively carried veneer pieces end to end to form a composed veneer plate 1b.

At the forward end of the outfeed conveyor 6 is provided a relay conveyor 10, which accepts the composed veneer plate 1b and carries it forwardly onto a gate conveyor 13. Along the course of travel of the composed veneer plate 1b on the relay conveyor 10 and the gate conveyor 13 are provided a second detector 11 such as limit switch or photo-electric switch and a second clipper 12. In this embodiment, the second detector 11 is provided at the rear portion of the gate conveyor 13, and the second clipper 12 is provided between the brake members 9 and the relay conveyor 10. When the composed veneer plate 1b is carried onto the gate conveyor 13 and travels through a predetermined position where the second detector 11 is provided, the front end of the veneer plate 1b is detected by the second detector 11 and then a cutting signal is sent to the second clipper 12 so as to cut out a full size veneer plate 1c from the composed veneer plate after the front end of the composed veneer plate 1b travels beyond the second detector 11 for a predetermined distance. The full size veneer plate 1c cut out of the composed veneer plate 1b falls down from the gate conveyor 13, when the front end of the plate 1c reaches to a predetermined front portion of the gate conveyor 13, and is stacked at such position.

Referring to a practical example of the first detectors 3 for the veneer pieces 1a, detectors 3 comprise several photo-electric tubes connected in such a manner that when an irregular shaped front edge of the veneer piece 1a travels through all of the detectors and prevents all light from being received by the photo-electric tubes, a front edge cutting signal is sent to the first clipper 4, and that when an irregular shaped rear edge of the veneer piece travels through one of the photo-electric tubes to allow the light to be received by such one photo-electric tube, a rear edge cutting signal is sent to the first clipper 4. Thus, the maximum available width of veneer piece 1a is obtained by removing irregular shapes from both front and rear edges thereof.

On the other hand, as to the second detector 11, only one photo-electric tube is sufficient because it is arranged to detect the straightly cut front end of the composed veneer plate 1b.

The first detectors 3 send signals not only to the first clipper 4 but also simultaneously to a driving means of the pitching conveyor 5. The pitching conveyor 5 is controlled by a signal such that when the veneer piece 1a stops moving so as to be cut by the first clipper 4, the pitching conveyor 5 swings up and temporarily stays there and that when the first clipper 4 descends to cut the irregular edge of the veneer piece and then ascends, the pitching conveyor 5 swings down to the horizontal position.

Namely, the signal from the first detectors 3 is sent to an intermittent drive means 15a, which is equipped on a crank axle 14 for ascending and descending the first clipper 4, and is used to cause one rotation of the crank axle 14. At the same time the signal from the first detectors 3 is sent to an intermittent drive means 15b, which is equipped on a crank axle 16 for swinging the pitching conveyor 5, and is used to cause a half rotation of the crank axle 16.

On the other hand, a signal from the second detector 11 is sent to an intermittent drive means 18, which is equipped on a crank axle 17 for ascending and descending the second clipper 12, and used to cause one rotation of the crank axle 17.

The above mentioned conventional veneer composer has the following problems to be solved.

(1) The control system for the conveyors for conveying the veneer piece 1a was a so called open loop system which comprises an electro-magnet clutch brake 19 and a motor 20, as shown in FIG. 1.

In such system, an acceleration time (ta) for restarting the conveyor 2 after a cutting operation to intermittently move a veneer piece 1a, and a deceleration time (td) for stopping the conveyor to set the veneer piece at a predetermined position, were both approximately 10 milliseconds, as shown in FIG. 2, because very abrupt acceleration and deceleration were required to perform high speed operation. Therefore, even if the veneer piece is held from above and below by upper and lower conveyor belts while being carried by the infeed conveyor 2, the imbalance of left and right sides of the veneer piece, because of the irregularly shaped front and rear edges thereof, causes unstable slippage of the veneer piece relative to the conveyor belts due to the difference of the friction resistance therebetween, especially by inertia, at the time of acceleration and deceleration of the conveyor 2. Thus, the veneer piece could not be carried and cut as desired, so that the actual front and rear cutting lines shown by solid lines in FIG. 3 have often been inclined relative to the desired cutting lines shown by dotted lines in FIG. 3. Therefore, the actual available width W2 of the veneer piece cut out of the irregular shaped veneer piece 1a became smaller than the the desired maximum available width W1. When the veneer pieces 1a having such inclined front and rear cutting lines are joined end to end to form a composed veneer plate as shown in FIG. 4, opposite sides of the composed veneer plate have irregular shapes similar to saw-tooth shapes. Therefore, the composed veneer plate of a desired transverse length of W3 could not be obtained and had to be cut to the transverse length of W4 as shown in FIG. 4. This resulted in a low production yield.

(2) According to the conventional veneer composer, in a situation when a position setting operation for cutting the composed veneer plate into full size overlaps with another position setting operation for cutting the irregular shaped rear edge of the veneer piece, the later position setting operation has controlled the both operations simultaneously. Thereby the veneer piece and the composed veneer plate could not be cut correctly at predetermined cutting positions, and an unexpected large amount of cutting errors has occurred.

Namely, referring to FIG. 1, there can occur a situation that after the front end of the composed veneer plate 1b is detected by the second detector 11, the rear irregular edge of the veneer piece 1a is detected by the first detectors 3 before the composed veneer plate stops at a predetermined full size cutting position. On the contrary, there can occur another situation that after the rear irregular edge of the veneer piece 1a is detected by the first detectors, the front end of the composed veneer plate 1b is detected by the second detector before the veneer piece 1a stops at a predetermined cutting position of the rear irregular edge. In both of the above situations the position setting operations for cutting the composed veneer plate 1b and the veneer piece 1a are overlapped with each other.

In each of the above cases, it has been conventional that both of the position setting operations are controlled by a transfer amount control system of the conveyors 2 and 6, wherein a later position setting data is rewritten on a memory in which an earlier position setting data has been written. Thus, the earlier detected data is erased by the later data, and the rewritten later data controls simultaneously both of the position settings of the veneer piece and the composed veneer plate.

Therefore, it sometimes happens that a maximum 40 mm cutting error of the composed veneer plate occurs, which corresponds to the length from the second detector 11 to the predetermined cutting position thereof, and also that a maximum 40 mm cutting error of the veneer piece occurs, which corresponds to the length from the first detectors to the predetermined cutting position of the veneer piece.

(3) As mentioned in (2) above, when the position setting operation for cutting the composed veneer plate into full size overlaps with the position setting operation for cutting the irregular shaped rear edge of the veneer piece, not only the outfeed conveyor 6 but also the pitching conveyor 5 stop moving simultaneously for a full size cutting operation. However, at this time, the infeed conveyor 2 is still moving. Therefore, the interval between the preceding veneer piece on the pitching conveyor 5 and the succeeding veneer piece on the infeed conveyor 2 becomes relatively smaller compared with the normal condition. Accordingly, difficulties have often occurred due to the fact that the pitching conveyor 5 opens before the veneer piece 1a completely travels through the pitching conveyor. That is, the rear portion of a veneer piece 1a having been cut to the available width crushed to the ascending first clipper 4 and is destroyed.

(4) According to the conventional veneer composer, when an inferior portion at midportion of a veneer piece 1a, which should be cut out by the first clipper 4, has a width of less than several 10 mm due to cracks in the veneer piece or the like, the position setting operations for cutting the front edge and rear edge of the inferior portion could not be done separately but were controlled at the same time by the position setting operation that comes later.

That is, the position setting operations for both the front and rear edges of the inferior portion are controlled by a transfer amount control system of the conveyors 2, 5 and 6, wherein a later detected position setting data is rewritten in a memory in which an earlier detected position setting data has been written. Thus, the earlier detected data is erased by the later data and the rewritten later data controls both of the position settings of the veneer piece. Therefore, if there is a small crack less than several 10 mm in width at the midportion of the veneer piece, the front end of the crack is first detected and the first cutting data is written in the memory. Then the rear end of the crack is detected and this second cutting data is written in the memory by overlapping the first written data so that the first data is erased by the second data. Thus, the second data for cutting the rear edge of the inferior portion controls both of the front and rear cutting operations thereof. This of course would cause an inferior product of the composed veneer plate and the final product.

SUMMARY OF THE INVENTION

The present invention is provided to improve the above mentioned problems of the conventional veneer composer.

A first object of the present invention is to provide a veneer composer in which a precise conveying operation of a veneer piece is carried out by a very short acceleration time without causing any disturbance to the amount of conveying of the veneer piece at right and left sides thereof, to enable parallel cutting of the front and rear ends of the veneer piece and to achieve a maximum available width thereof.

A second object of the present invention is to provide a veneer composer having very high productivity and yield, wherein only inferior portions of the veneer piece are cut out at a desired cutting position without fail, and wherein no composed veneer plate shorter or longer than a predetermined length is produced.

A third object of the present invention is to provide a veneer composer in which a pitching conveyer is made not to open until a veneer piece travels through the pitching conveyor completely, even when a position setting operation for cutting a composed veneer plate into a predetermined full size is overlapped with a position setting operation for cutting a rear irregular edge of the veneer piece, thereby improving quality and yield of the resultant products.

A fourth object of the present invention is to provide a veneer composer which is able to cut out an inferior portion in a midportion of a veneer piece without fail, even if the width of the inferior portion is less than several 10 mm due to cracks or the like of the veneer piece.

In order to attain the above first object, a veneer composer according to the present invention comprises conveyor means for conveying veneer pieces intermittently, a first clipper means for cutting the veneer piece into maximum available width, means for joining the veneer pieces end-to-end to form a composed veneer plate of long length, and a second clipper means for cutting the composed veneer into a predetermined full size. The conveyor means is connected to servo motors and digital control circuits to be controlled such that when the conveyor means is restarted after an operation of cutting a veneer piece, a buffer acceleration time (Ta) approximately from 40 ms to 200 ms, preferably approximately 40 ms, is set for the conveyer means, and that when the conveyer means is decelerated for setting the veneer piece to a predetermined cutting position, a buffer deceleration time (Td) approximately from 80 ms to 200 ms, preferably approximately 80 ms, is set for the conveyor means.

In order to attain the second object of the present invention, the veneer composer further comprises a priority judging and control means in the digital control circuit for judging which of the first clipper and the second clipper should be operated first by calculating a difference (X) from a full size cutting position data of the composed veneer plate to a rear edge cutting position data of the veneer piece.

In order to attain the third object of the present invention, the veneer composer further comprises a prohibition circuit in the digital control circuit for controlling the operation of the conveyor means including an infeed conveyor, a pitching conveyor and an outfeed conveyor, wherein a difference (X) from a full size cutting position data of the composed veneer plate to a rear edge cutting position data of the veneer piece is calculated, and when the difference is equal to or larger than 0 and not more than 20 mm ($0 \leq x \leq 20$), an upward swinging movement of the pitching conveyor and restart operation of the infeed conveyor are prohibited until the full size cutting operation of the second clipper means is finished.

In order to attain the fourth object of the present invention, the veneer composer further comprises a priority judging circuit in the digital control circuit for controlling the operation of the first clipper means and the conveyer means including an infeed conveyer, an outfeed conveyer and a pitching conveyer, wherein a difference (Y) from a front edge cutting position data to a rear edge cutting position data of the veneer piece is calculated, and when the difference is equal to or larger than zero ($Y \geq 0$), the rear edge cutting operation is carried out prior to the front edge cutting operation, and when the difference is less than zero ($Y < 0$), the front edge cutting operation is carried out prior to the rear edge cutting operation.

Other objects and features of the present invention will become apparent from the following detailed description of the present invention when taken in conjunction with the accompanying drawings, in which:

DESCRIPTION OF THE PREFERRED EMBODIMENTS OF THE INVENTION

Figure 1:
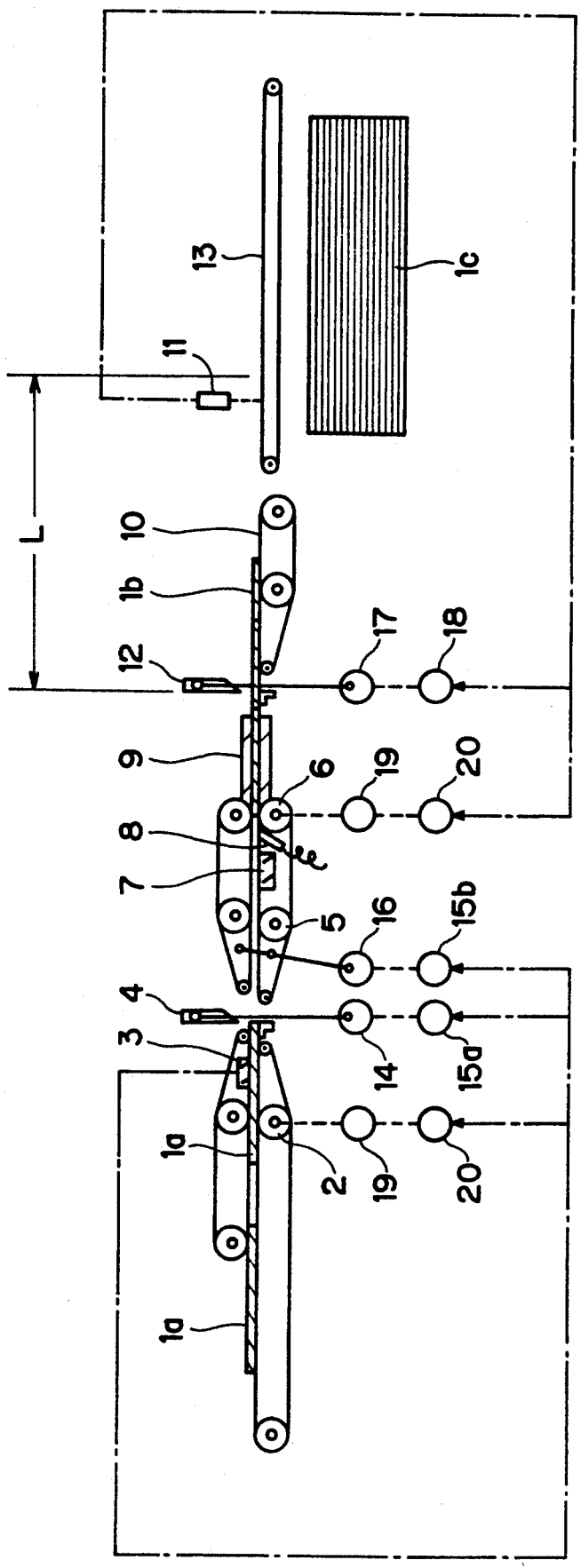
FIG. 1 is a schematic view of a conventional veneer composer.
Figure 2:
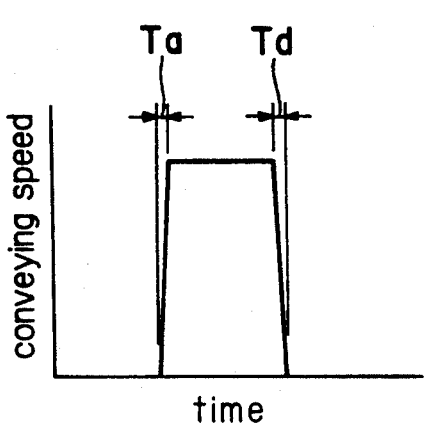
FIG. 2 is a diagram showing conveying characteristics of conveyor means in the conventional veneer composer.
Figure 3:
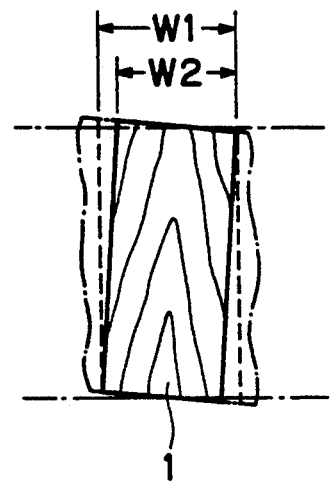
FIG. 3 is a plan view showing a conveying posture of a veneer piece according to the conventional veneer composer.
Figure 4:
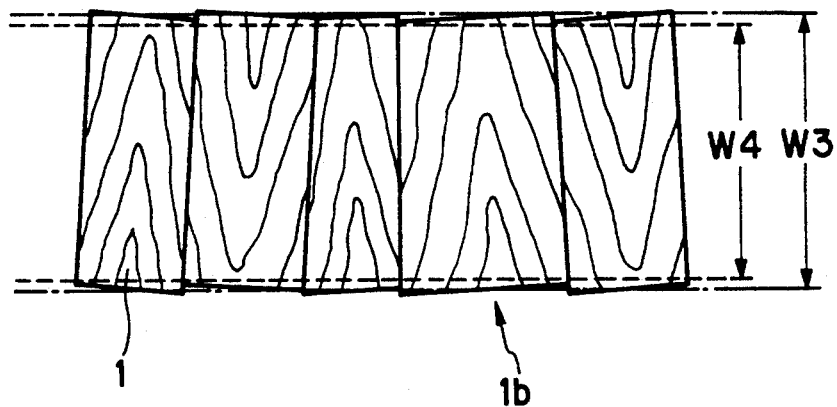
FIG. 4 is a plan view of a composed veneer plate according to the conventional veneer composer.

A mechanical structure of a veneer composer of the present invention is substantially the same as that of the conventional. Thus, the same reference numerals used in the conventional veneer composer are employed to designate the same parts of the present invention, and explanation of the mechanical structure of the present invention same as the conventional one and is omitted herein.

Figure 5:
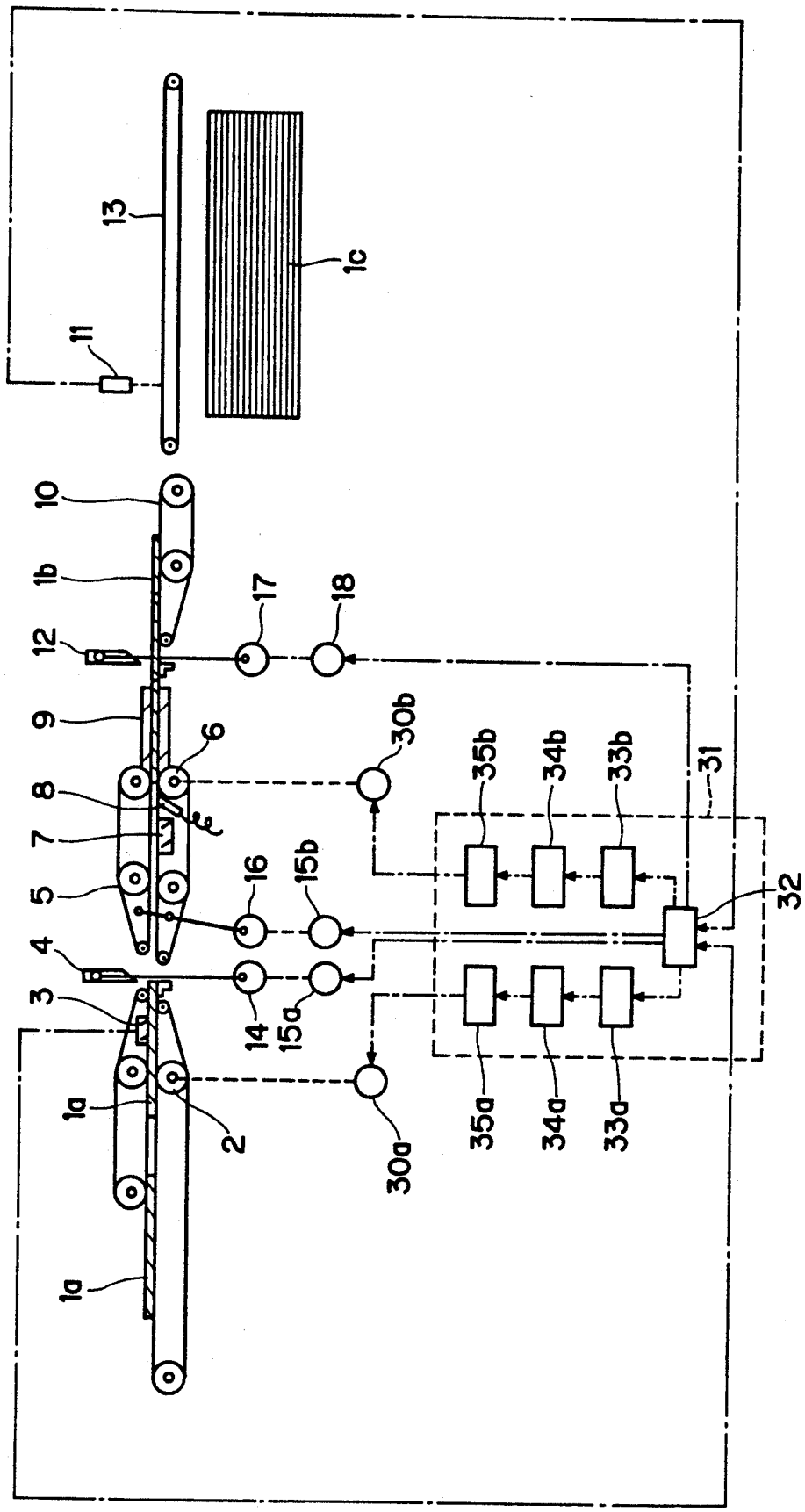
FIG. 5 is a schematic view showing a control system of a veneer composer according to a first embodiment of the present invention.

A first embodiment of the present invention is explained with reference to FIG. 5. In the veneer composer according to this embodiment, an infeed conveyor 2 and an outfeed conveyor 6 are respectively arranged to be driven intermittently by servo motors 30a and 30b and digital control circuit 31. Namely, the infeed and outfeed conveyors 2 and 6 are connected to be driven by servo motors 30a and 30b, respectively. The digital control circuit 31 comprises a sequencer 32 for controlling, servo parameter memories 33a and 33b for setting initial conditions, servo controllers 34a and 34b for position setting, and servo drive units 35a and 35b, the latter three pairs of elements being respectively connected in the above order with the sequencer 32. The servo motors 30a and 30b are connected to be driven by the servo drive units 35a and 35b, respectively. The sequencer 32 is connected respectively to an intermittent drive mechanism 15a, which is equipped on a crank axle 14 to move a first clipper 4 up and down by one rotation of the axle 14, an intermittent drive mechanism 15b, which is equipped on a crank axle 16 to swingably move a pitching conveyor 5 by a half rotation of the axle 16, and an intermittent drive mechanism 18, which is equipped on a crank axle 17 to move a second cutter 12 up and down by one rotation of the axle 17. Each of the above intermittent drive mechanisms may be, an electro-magnetic clutch brake, a servo motor, an air cylinder or an oil cylinder. Also connected to the sequencer 32 are first detectors 3 for veneer piece and a second detector 11 for the composed veneer plate.

In accordance with the above structure of the present invention, the infeed and outfeed conveyors 2 and 6, respectively, are controlled and intermittently driven by the servo motors 30a and 30b and digital control circuit 31.

Figure 6:
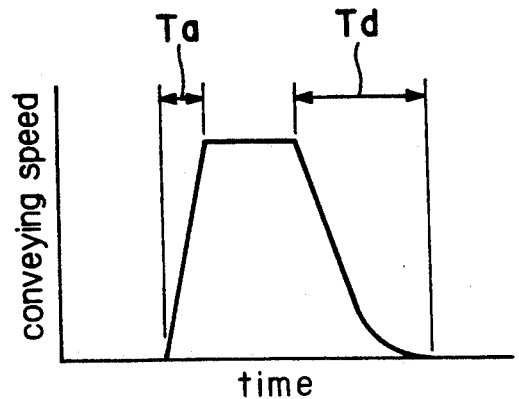
FIG. 6 is a diagram showing conveying characteristics of conveyor means according to the above embodiment of the present invention.

According to the present invention, when the infeed conveyor 2 and outfeed conveyor 6 are restarted after an operation of cutting a veneer piece, a buffer acceleration time Ta from 40 ms to 200 ms, preferably approximately 40 ms, is respectively set for the conveyors 2 and 6. Also, when the infeed conveyor 2 and outfeed conveyor 6 are decelerated for setting the veneer piece to a predetermined cutting position, a buffer deceleration time Td approximately from 80 ms to 200 ms, preferably approximately 80 ms, is set for the conveyors. The above intermittent driving characteristics are shown in FIG. 6.

The reason why the minimum buffer acceleration time Ta and the minimum buffer deceleration time Td are set to 40 ms and 80 ms, respectively, is based on a confirmed facts that the veneer piece still can be conveyed without causing any disturbance to the amount of conveying of the veneer piece at the right and left sides thereof and that the veneer piece can accurately be set to a predetermined position by such deceleration time. The reason why the maximum buffer acceleration time Ta and the maximum buffer deceleration time Td are set to approximately 200 ms is that any reduction of productivity is still in an economically allowable range.

Figure 7:
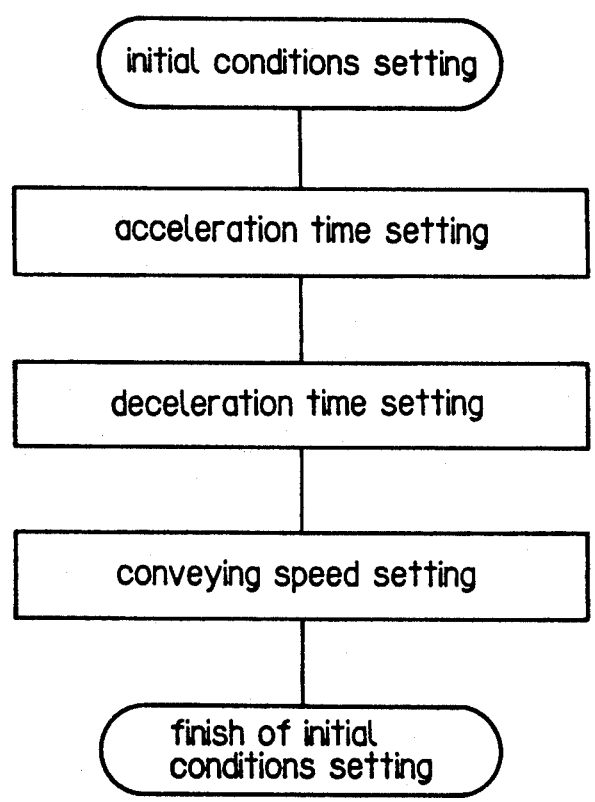
FIG. 7 is a flow chart for setting initial conditions of acceleration time and the like of infeed and outfeed conveyors according to the above embodiment of the present invention.
Figure 8:
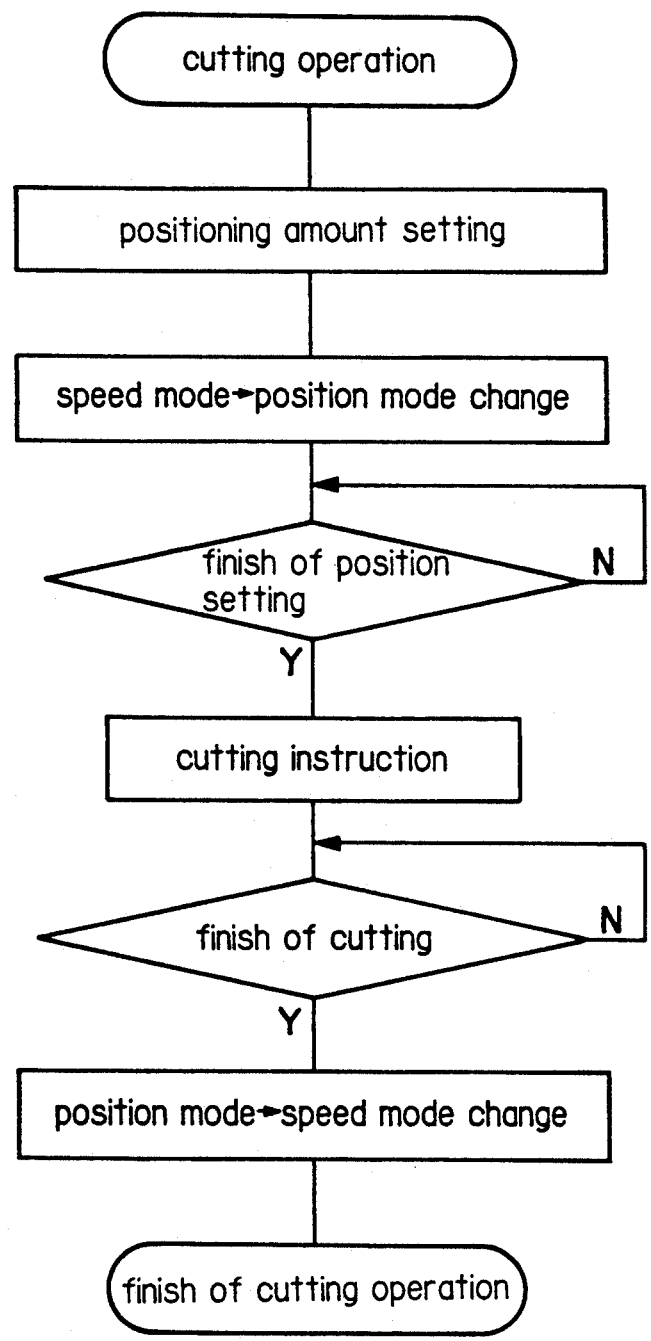
FIG. 8 is a flow chart showing cutting operations of veneer piece according to the above embodiment of the present invention.

In a practical example, initial conditions such as acceleration time 40 ms, deceleration time 80 ms and conveyor speed 40 m/mm are preset by the servo parameter memories 33a and 33b in the digital control circuit 31 as shown in the flow chart in FIG. 7. Then, when the servo motors 30a and 30b of the infeed conveyor 2 and outfeed conveyor 6, respectively, are driven by the servo parameter memories 33a and 33b, servo controllers 34a and 34b and servo drive units 35a and 35b in the digital control circuit 31, the infeed conveyor 2 and outfeed conveyor 6 are restarted to convey the veneer piece 1a, and inferior portions of the veneer piece such as irregular shaped front and rear edges, cracks or knotholes are detected by the first detectors 3. The detected signal is sent to the sequencer 32 in the digital control circuit 31 and is then sent through the servo parameter memories 33a and 33b, the servo controllers 34a and 34b and the servo drive units 35a and 35b to the intermittent drive controller of the servo motors 30a and 30b and also to the intermittent drive means 15a and 15b equipped on the crank axles 14 and 16 of the first clipper 4 and pitching conveyor 5, respectively. Therefore, one rotation control of the first clipper 4 and a half rotation of the pitching conveyor 5 are alternately carried out, as shown in the flow chart in FIG. 8. Due to the buffer acceleration and deceleration controls of the infeed and outfeed conveyors 2 and 6 by means of the servo motors 30a and 30b and digital control circuit 31, each veneer piece 1a is carried by the conveyors accurately as desired to the cutting position and cut such that front and rear cutting lines thereof are parallel with each other and that the maximum available width is obtained from the veneer piece having irregular shaped front and rear edges. These veneer pieces 1a are then transferred to the outfeed conveyor 5 and 6 and are joined end to end, by an adhesive agent such as hot melt resin or by adding adhesive threads immersed with the adhesive hot melt resin, to form a composed veneer plate 1b. During this time of forming the composed veneer plate 1b, the successively transferred veneer pieces 1a are joined without forming any irregular side edges having a saw-tooth wave shape and which have been formed by the conventional veneer composer and which have to be cut off later. Thus, the present veneer composer has a very high productivity and yield.

Figure 9:
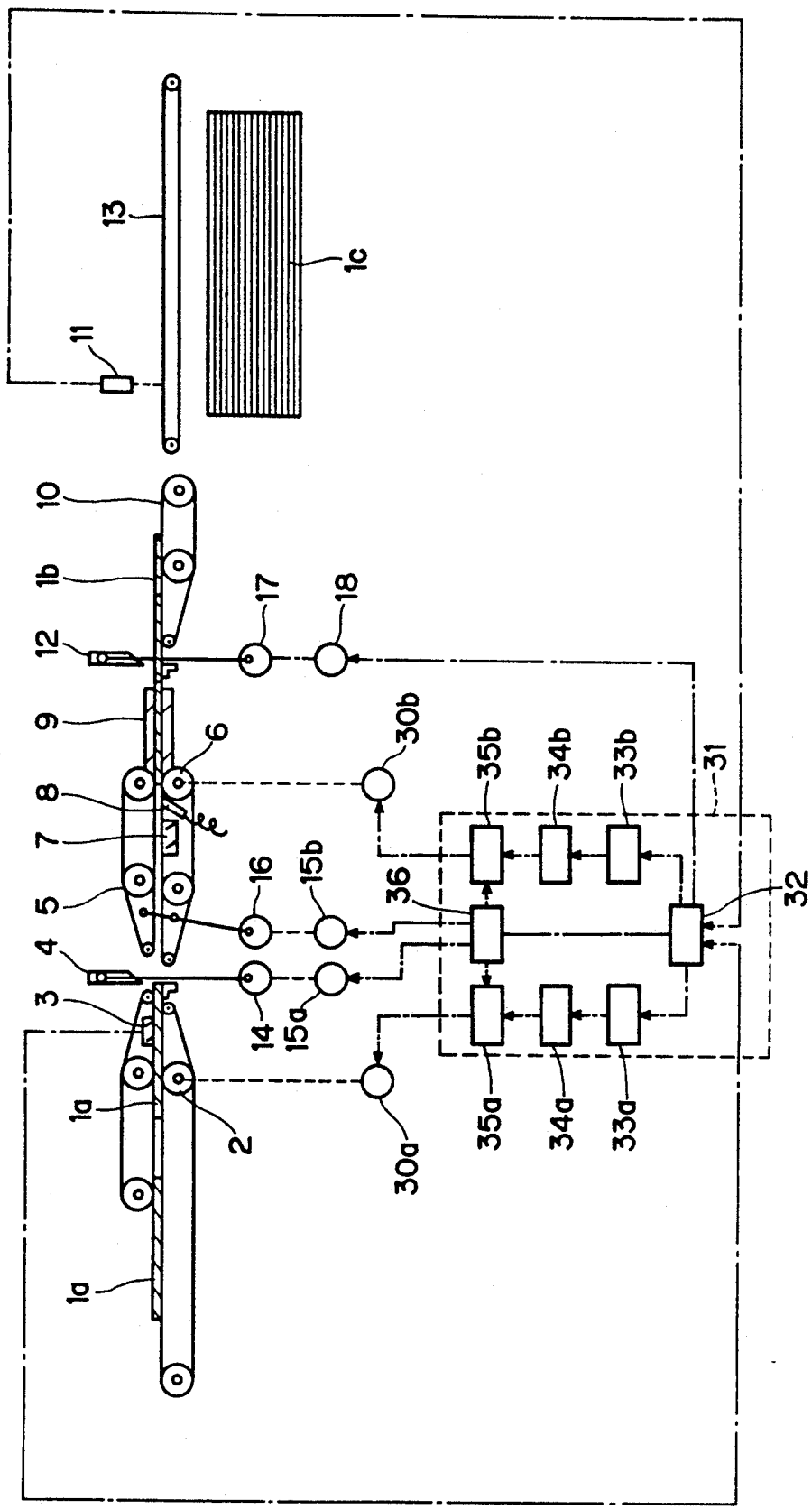
FIG. 9 is a schematic view showing a control system according to a second embodiment of the present invention.

According to a second embodiment of the present invention, shown in FIG. 9, a priority judging circuit 36 is provided in the digital control circuit 31, for judging which of the first clipper 4 and the second clipper 12 should be operated first by calculating a difference (X) between a full size cutting position data of the composed veneer plate 1b and a rear edge cutting position data of the veneer piece 1a.

Thus, each of the servo motors 30a and 30b for driving the infeed and outfeed conveyors 2 and 6, respectively, has an encoder therein which generates pulses proportional to the conveying length of the veneer piece 1a or the composed veneer plate 1b. For example, one pulse is generated for every 1 mm movement of the conveyor. The pulses generated by the encoder are sent to a position setting counter which is included in the sequencer 32 in the digital control circuit 31 shown in FIG. 9. A counter of 32 bits, for example, repeatedly counts the pulses up to the 32nd power of 2 and the thus counted pulses become position setting data of the infeed and outfeed conveyors 2 and 6, respectively.

The sequencer 32 is constructed to receive signals from the first detectors 3, which are photo-electric detectors for example, arranged in the transverse direction of the infeed conveyor 2. When the irregular shaped front edge of the veneer piece 1a is carried to a place where all of the light of the photo-electric detectors is intercepted by the veneer piece, the signal generated from the detectors 3 is judged as a front end cutting signal. By this signal, a position data of the infeed conveyor 2 can be obtained. Since the distance from the position of the first detectors 3 to the clipper 4 is constant, on the basis of this distance, a distance data for front cutting is preset. Therefore, a front cutting position data is obtained by adding the above position data of the infeed conveyor and the distance data. On the other hand, when the irregular shaped rear edge of the veneer piece 1a is carried to a position where one of the photo-electric detectors receives light, the signal generated from the detectors is judged as a rear end cutting signal. By this signal, a position data of the infeed conveyor can be obtained. Also, a rear cutting position data is obtained by adding this position data and a distance data for rear cutting, the latter being preset in a similar way to the distance data of front cutting.

In the case of the second detector 11 for full size cutting, a position data of the outfeed conveyor 6 is obtained when the second detector 11 detects the front end of the composed veneer 1b. In this case, a distance data for full size cutting is preset on the basis of the distance from the second detector 11 to the full size cutting position. A full size cutting position data is obtained by adding the above position data and the distance data.

Figure 10:
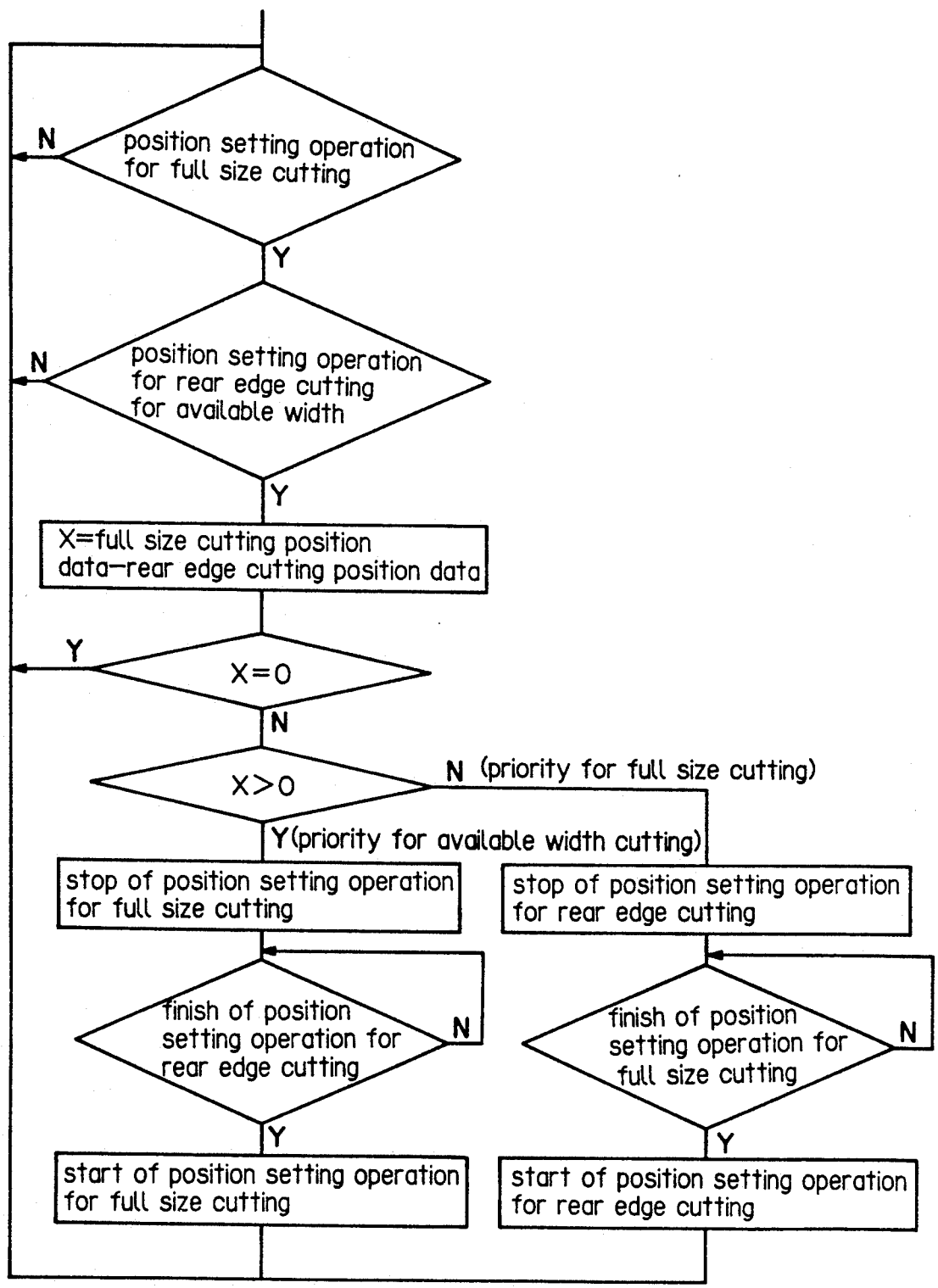
FIG. 10 is a flow chart for judging which of an irregular edge cutting of a veneer piece or a full size cutting of a composed veneer plate has priority to by carried out first in accordance with the control system of the second embodiment of the present invention.

In this embodiment, a difference (X) from the full size cutting position data to the rear cutting position data is obtained in the sequencer 32. The judging circuit 36 provided in the digital control circuit 31 judges to operate the first clipper 4 for the veneer piece first for cutting the rear irregular edge thereof when the difference (X) is larger than zero (X>0), to operate the second clipper 12 for the composed veneer plate first when the difference (X) is smaller than zero (X<0), and to operate both clippers at the same time when the difference (X) is equal to zero. A flow chart of judging circuit 36 is shown in FIG. 10. That is, when the first clipper 4 for a veneer piece 1a is operated first when the difference (X) is larger than zero, the position setting operation for full size cutting is temporarily stopped until the cutting operation for the rear edge of the veneer piece 1a is finished. On the other hand, when the second clipper 12 is operated first when the difference (X) is smaller than zero, the position setting operation for cutting the rear edge of the veneer piece is temporarily stopped until the full size cutting operation is finished.

As disclosed above, since the judging circuit 36 is provided in the second embodiment of the present invention, even if the position setting operation for full size cutting by the second clipper 12 is overlapped with the position setting operation for cutting the rear irregular edge of the veneer piece by the first clipper 4, the priority of the cutting order is determined by the judging circuit, whereby either one of the cutting operations of the veneer piece or the composed veneer plate can be performed as desired without being effected by the other.

Figure 11:
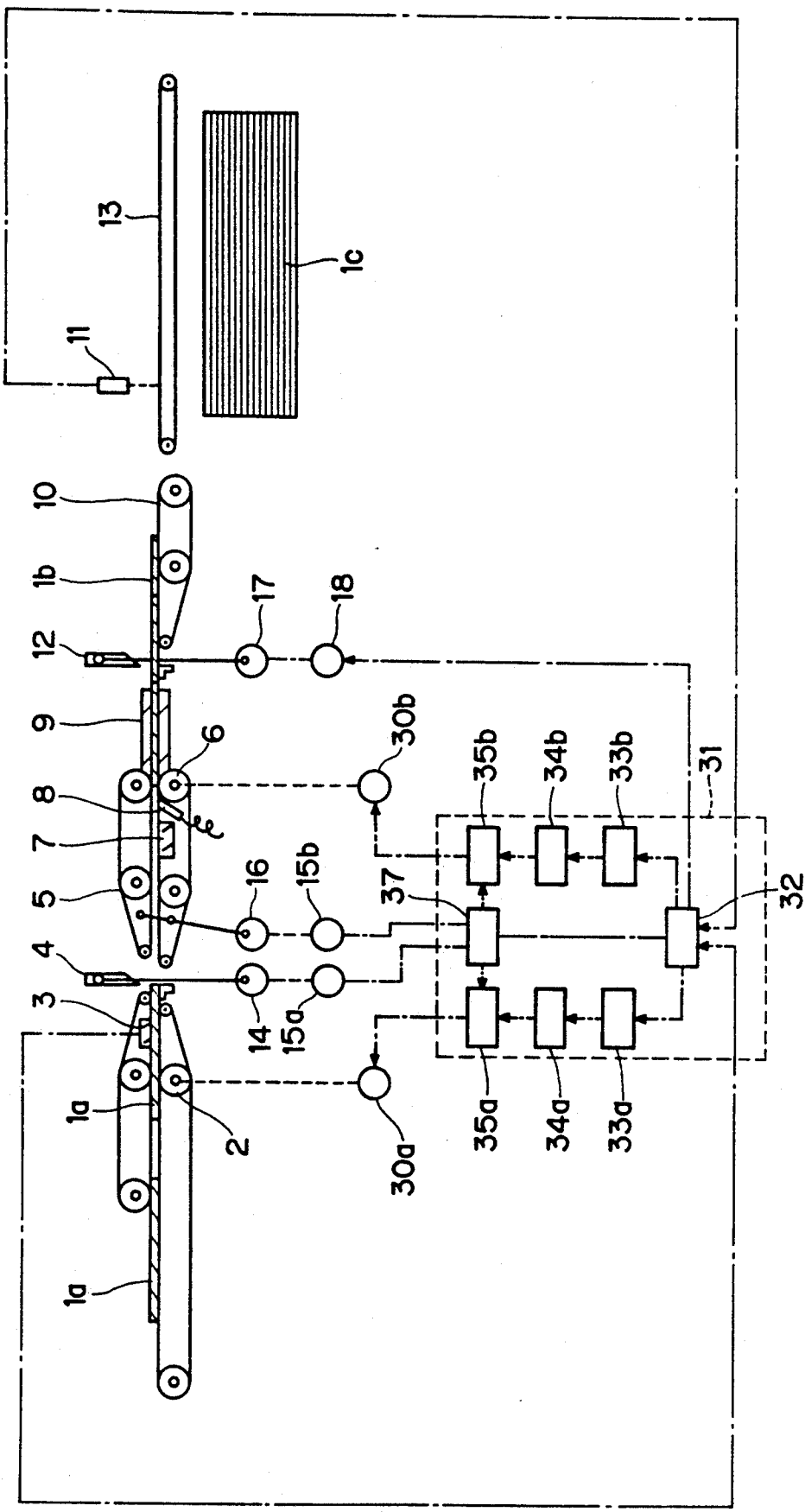
FIG. 11 is a schematic view showing a control system according to a third embodiment of the present invention.
Figure 12:
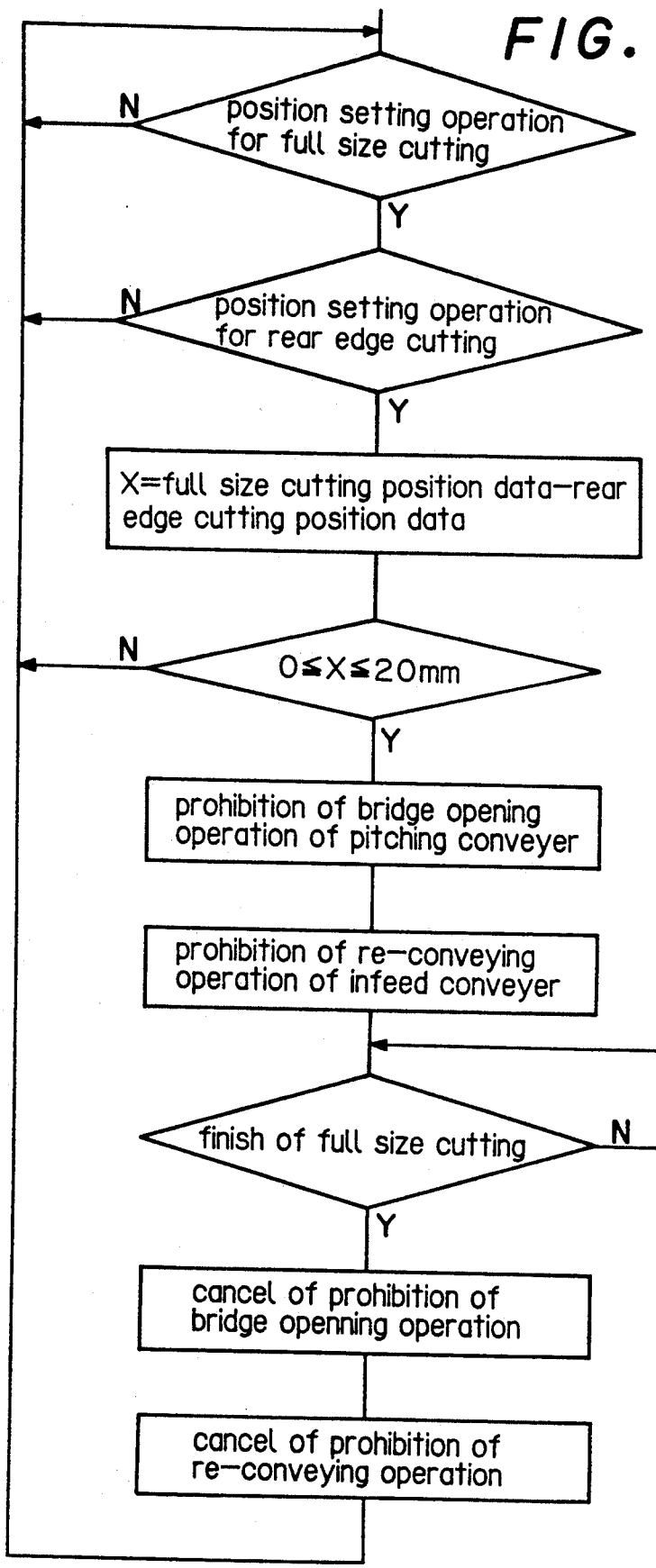
FIG. 12 is a flow chart for temporarily prohibiting a swinging movement of a pitching conveyor and a restart operation of an infeed conveyor in accordance with the control system of the third embodiment of the present invention.

According to a third embodiment of the present invention, as shown in FIG. 11, a difference (X) from the full size cutting position data of the composed veneer to the rear edge cutting position data of the veneer piece is obtained as in the case of the second embodiment. But, in this embodiment a prohibition circuit 37 is provided in the digital control circuit 31 as shown in FIG. 11 so as to control the movements of the pitching conveyor 5 and the infeed conveyor 2 in such a manner that when the difference (X) is equal to or larger than zero but not larger 20 mm (($0 \leq X \leq 20$), an upward swinging motion of the pitching conveyor 5 as well as a transfer movement of the infeed conveyor is temporarily prohibited, and that when the full size cutting operation of the composed veneer has finished, the above prohibition is released. An example of a flow chart of this prohibition circuit is shown in FIG. 12.

With the provision of the prohibition circuit 37, even if the position setting operation for cutting the composed veneer plate into the full size by the second clipper 12 overlaps with the position setting operation for cutting the rear edge of the veneer piece, the prohibition circuit 37 is operated, whereby the pitching conveyor 5 does not swing upwards until the veneer piece cut to the maximum available width is carried enough to insure safe transfer of the veneer piece.

Figure 13:
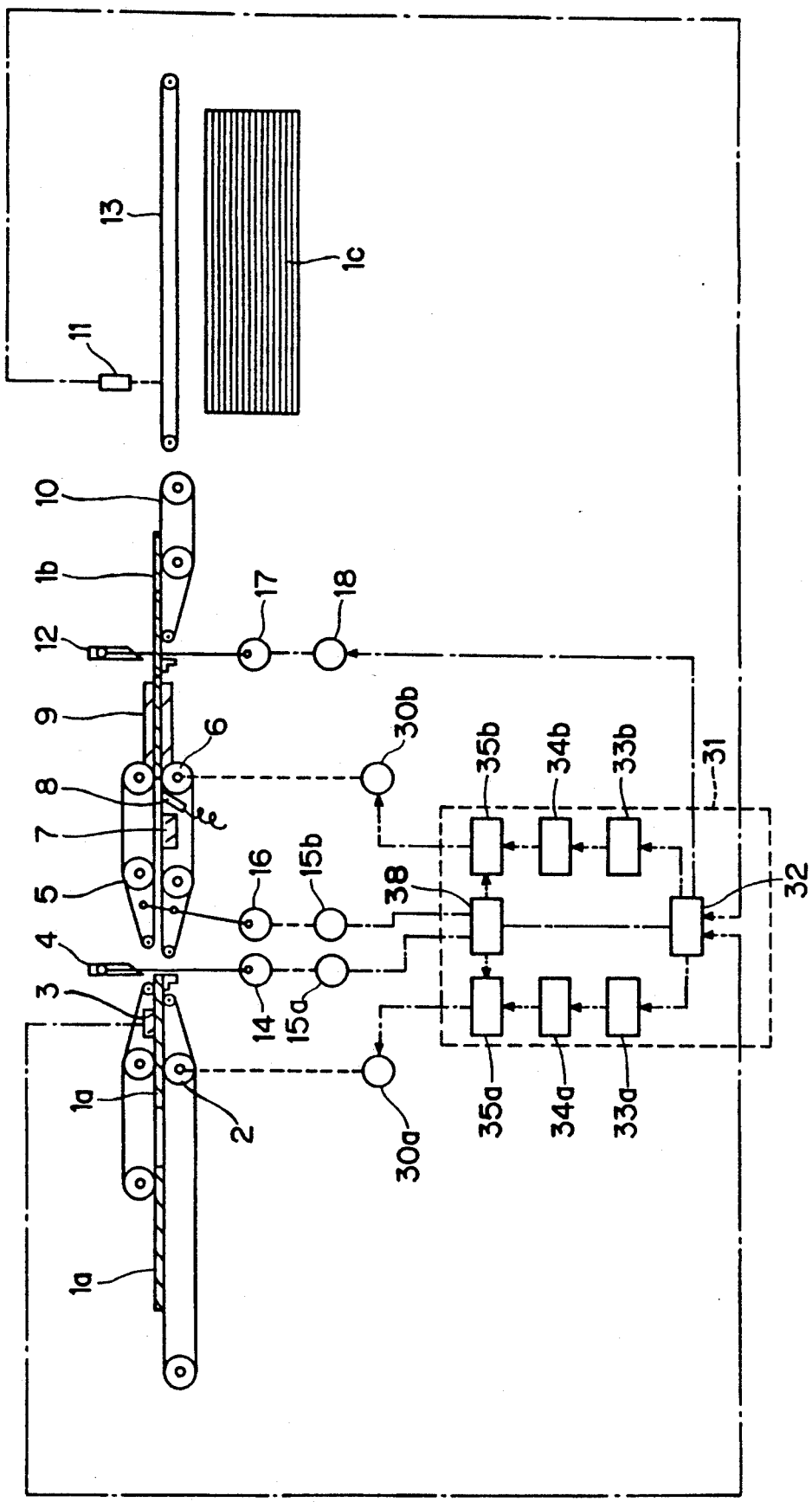
FIG. 13 is a schematic view showing a control system according to a fourth embodiment of the present invention.
Figure 14:
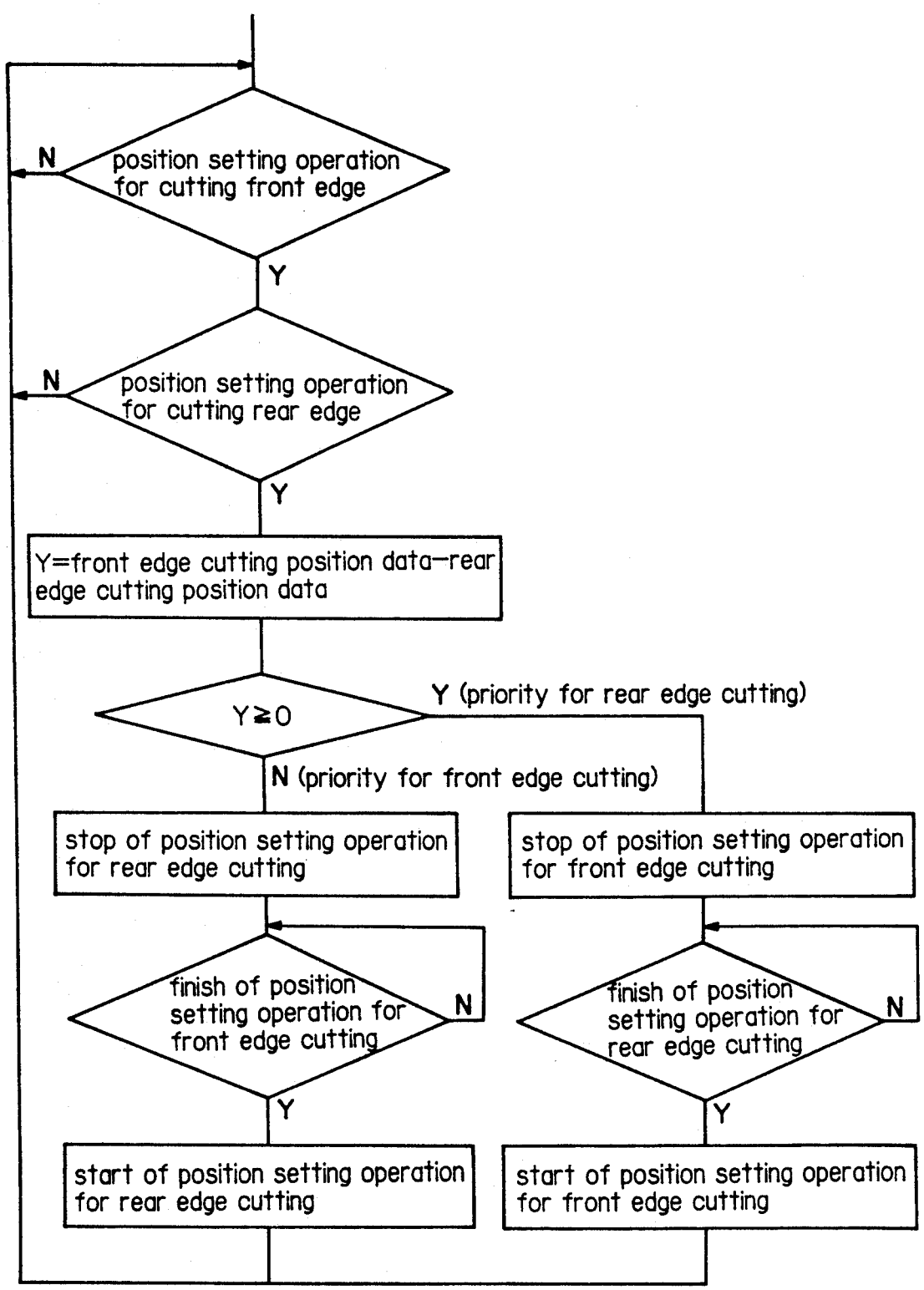
FIG. 14 is a flow chart for judging priority of cutting in accordance with the control system of the fourth embodiment of the present invention.

A fourth embodiment of the present invention is shown in FIG. 13, in which a priority judging circuit 38 is provided in the digital control circuit 31 for deciding which of the front edge cutting operation or the rear edge cutting operation of the veneer piece is to be carried out first. That is, when there is an inferior portion such as crack in the veneer piece, a front edge cutting position data and a rear edge cutting position data are obtained. Then, a difference (Y) from the front edge cutting position data to the rear edge cutting position data is calculated in the sequencer 32. On the basis of such calculation the priority judging circuit 38 controls not only the first clipper 4 but also the conveyors 2, 5 and 6 in such a manner that when the difference (Y) is equal to or larger than zero (Y$\geq$0), the rear edge cutting operation is carried out prior to the front edge cutting operation, and that when the difference is smaller than zero (Y<0), the front edge cutting operation is carried out prior to the rear edge cutting operation. When the rear edge cutting operation is carried out first, the position setting operation for cutting the front edge is temporarily stopped. Such stopping is released after the position setting operation for cutting the rear edge is finished. On the contrary when the front edge cutting operation is carried out first, the position setting operation for cutting the rear edge is temporarily stopped, and such stopping is released after the position setting operation for cutting the front edge is finished. An example of a flow chart of this priority judging circuit 38 is shown in FIG. 14.

With the provision of the priority judging circuit 38, even if there is an inferior portion, such as crack of the width less than several 10 mm, in the midportion of the veneer piece, the priority judging circuit 38 is operated, whereby even a very small inferior portion of the veneer plate, such as a crack, knothole or the like, can be cut out of the veneer piece without fail. Thus, production quality and yield is improved substantially by the present invention.

Although the present invention has been described with reference to preferred embodiments there of many modifications and alterations may be made within the scope and spirit of the present invention.

What is claimed is:
1. A veneer composer comprising:
conveyor means for conveying veneer pieces intermittently;
a first detector for detecting a transfer of a veneer piece on said conveyor means;

a first clipper means for cutting the veneer piece into an available width upon receipt of a signal from said first detector;

means for joining the veneer pieces end-to-end to form a composed veneer plate of long length;

a second detector for detecting a transfer of the composed veneer plate on said conveying means;

a second clipper means for cutting the composed veneer plate into a predetermined full size upon receipt of a signal from said second detector;

servo motors connected to said conveyor means for operation thereof; and digital control circuit means, operatively connected at least to said servo motors to control operation thereof, for, when said conveyor means is to be restarted after an operation of cutting of a veneer piece, setting a buffer acceleration time (Ta) approximately from 40 ms to 200 ms of said conveyor means, and for, when said conveyer means is to be decelerated for setting the veneer piece to a predetermined cutting position, setting a buffer deceleration time (Td) approximately from 80 ms to 200 ms of said conveyor means.

2. A veneer composer as claimed in claim 1, wherein said digital control circuit means comprises a controlling sequencer to which a servo parameter memory for setting initial conditions, a servo controller for position setting and a servo drive unit are connected to control each said servo motor, said sequencer being connected with said first detector to receive said signal therefrom.

3. A veneer composer as claimed in claim 1, wherein said conveyor means comprises an infeed conveyor and an outfeed conveyor, each of said conveyors being connected with a respective said servo motor, and said digital control circuit means comprises a controlling sequencer to which are connected servo parameter memories for setting initial conditions, servo controllers for position setting and servo drive units to control respective said servo motors, said sequencer being connected with said first and second detectors and also with said first and second clipper means.

4. A veneer composer as claimed in claim 3, wherein said first and second clipper means are respectively equipped with intermittent drive means connected with said sequencer.

5. A veneer composer as claimed in claim 3, wherein said conveyor means further comprises a pitching conveyor which is equipped with an intermittent drive means for swinging movement of said pitching conveyor, said pitching conveyor intermittent drive means being connected with said sequencer.

6. A veneer composer as claimed in claim 1, wherein said digital control circuit means further comprises priority judging and control circuit means for judging which of said first clipper means and said second clipper means is to be operated first by calculating a difference (X) from a full size cutting position data of the composed veneer plate to a rear edge cutting position data of a veneer piece.

7. A veneer composer as claimed in claim 1, wherein said conveyor means comprises an infeed conveyor, a pitching conveyor and an outfeed conveyor, and said digital control circuit means further comprises prohibition circuit means for controlling operation of said conveyor means by calculating a difference (X) from a full size cutting position data of the composed veneer plate to a rear edge cutting position data of a veneer piece, and when said difference is equal to or larger than zero but not larger than 20 mm ($0 \leq X \leq 20$), prohibiting an upward swinging movement of said pitching conveyor and an operation of restarting said infeed conveyor until a cutting operation by said second clipper means is finished.

8. A veneer composer as claimed in claim 1, wherein said conveyor means comprises an infeed conveyor, a pitching conveyor and an outfeed conveyor, and said digital control circuit means further comprises priority judging circuit means for controlling the operation of said first clipper means and said conveyor means by calculating a difference (Y) from a front edge cutting position data to a rear edge cutting position data of a veneer piece, and when said difference is equal to or larger than zero ($Y \geq 0$) causing a rear edge cutting operation to be carried out prior to a front edge cutting operation, and when said difference is less than zero ($Y < 0$) causing the front edge cutting operation to be carried out prior to the rear edge cutting operation.

* * * * *